United States Patent
Lee et al.

(10) Patent No.: US 9,413,018 B2
(45) Date of Patent: Aug. 9, 2016

(54) HOLLOW FIBER MEMBRANE MODULE (71) Applicant: KOLON INDUSTRIES, INC., Gwacheon-si, Gyeonggi-do (KR)

(72) Inventors: Jin Hyung Lee, Yongin-si (KR); Kyoung Ju Kim, Yongin-si (KR); Young Seok Oh, Yongin-si (KR); Moo Seok Lee, Seoul (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 7 days.

(21) Appl. No.: 14/419,697

(22) PCT Filed: Sep. 17, 2013

(86) PCT No.: PCT/KR2013/008386
§ 371 (c)(1),
(2) Date: Feb. 5, 2015

(87) PCT Pub. No.: WO2014/046450
PCT Pub. Date: Mar. 27, 2014

(65) Prior Publication Data
US 2015/0188162 A1    Jul. 2, 2015

(30) Foreign Application Priority Data

Sep. 21, 2012 (KR) .................. 10-2012-0105106

(51) Int. Cl.
*B01F 3/04* (2006.01)
*H01M 8/04* (2016.01)
*B01D 63/04* (2006.01)
*B01D 69/08* (2006.01)

(52) U.S. Cl.
CPC .......... *H01M 8/04149* (2013.01); *B01D 63/04* (2013.01); *B01D 63/043* (2013.01); *B01D 69/08* (2013.01); *B01F 3/04007* (2013.01); *B01D 2313/08* (2013.01); *B01D 2313/20* (2013.01); *B01D 2313/23* (2013.01); *B01D 2319/02* (2013.01); *B01F 2215/0098* (2013.01); *Y02E 60/50* (2013.01)

(58) Field of Classification Search
CPC ...... B01D 63/04; B01D 63/043; B01D 69/08; B01D 2313/08; B01D 2313/20; B01D 2313/23; B01D 2319/02; B01D 2319/04; B01F 3/04007; B01F 2215/0098; H01M 8/04149; Y02E 60/50
USPC ......................................... 261/23.1, 100, 104
See application file for complete search history.

(56) References Cited

U.S. PATENT DOCUMENTS

| | | | | |
|---|---|---|---|---|
| 5,718,869 | A | * | 2/1998 | Bach .................... A61M 1/1698 422/44 |
| 6,183,639 | B1 | * | 2/2001 | de Winter .............. B01D 63/02 210/321.79 |

(Continued)

FOREIGN PATENT DOCUMENTS

| | | |
|---|---|---|
| JP | 2003-157872 A | 5/2003 |
| JP | 2007-212076 A | 8/2007 |
| WO | 2011/122822 A2 | 10/2011 |

OTHER PUBLICATIONS

International Searching Authority, International Search Report of PCT/KR2013/008386 dated Jan. 16, 2014.

*Primary Examiner* — Charles Bushey
(74) *Attorney, Agent, or Firm* — Sughrue Mion, PLLC (57) ABSTRACT A hollow fiber membrane module is disclosed. In particular, technology for achieving a reduction in pressure deviation of channels generated when an external fluid passes through a case, thereby achieving a uniform flow rate of the fluid through each channel.

5 Claims, 7 Drawing Sheets

(56) References Cited

U.S. PATENT DOCUMENTS

| | | | |
|---|---|---|---|
| 7,285,106 B2 * | 10/2007 | Collins | B01D 61/142 210/321.64 |
| 2001/0015500 A1 | 8/2001 | Shimanuki et al. | |
| 2010/0068603 A1 | 3/2010 | Kanazawa et al. | |
| 2013/0306545 A1 * | 11/2013 | Shinohara | B01D 63/022 210/321.89 |

* cited by examiner

HOLLOW FIBER MEMBRANE MODULE

CROSS REFERENCE TO RELATED APPLICATIONS

This is a National Stage of International Application No. PCT/KR2013/008386 filed Sep. 17, 2013, claiming priority based on Korean Patent Application No. 10-2012-0105106 filed Sep. 21, 2012, the contents of all of which are incorporated herein by reference in their entirety.

TECHNICAL FIELD

The present invention relates to a hollow fiber membrane module for use in fuel cells, and more particularly to technology for achieving an enhancement in moisture transfer efficiency by establishing a uniform flow rate throughout the interior of a hollow fiber membrane module during introduction of an external fluid to be used for moisture transfer.

BACKGROUND ART

In general, a fuel cell is a power generation cell capable of generating electricity through combination of hydrogen and oxygen. Differently than general chemical cells, such a fuel cell has an advantage in that it is possible to continuously generate electricity, so long as hydrogen and oxygen are supplied, and production of environmental pollutants during power generation is reduced because the fuel cell employs a system of converting chemical energy into electrical energy through hydrogen-oxygen combination.

Among such fuel cells, a polymer electrolyte fuel cell currently exhibit or will exhibit, in future, high practical utility in that miniaturization is possible.

Such a polymer electrolyte fuel cell may secure desired power generation efficiency when a certain amount of moisture is supplied to the polymer electrolyte membrane of a membrane electrode assembly (MEA) in order to maintain an appropriate moisture content of the polymer electrolyte membrane.

As a method of humidifying the polymer electrolyte membrane, as mentioned above, there are a bubbler method, a direct spray method, and a membrane humidifying method. In particular, the membrane humidifying method is a method of bringing external fluid into contact with hollow fibers containing moisture, to increase the moisture content of the fluid, and then supplying the humidified fluid to an electrolyte membrane.

Figure 1:
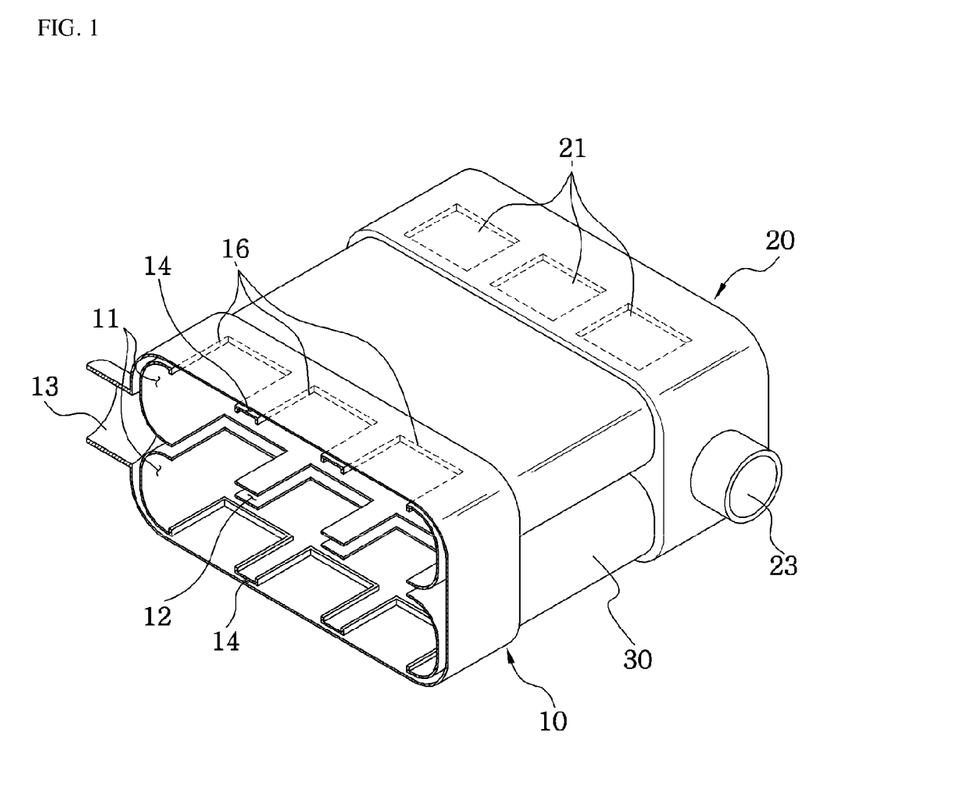
FIG. 1 is a perspective view of a conventional hollow fiber membrane module.

Such a hollow fiber membrane module basically has a structure in which an introduction case 10, a connecting case 30, and a discharge case 20 are connected to one another, as shown in FIG. 1.

In each of the introduction case 10 and discharge case 20, accommodation spaces 11 are vertically arranged while being spaced apart from each other by a predetermined distance. Hollow fiber bundles 40 are filled in the upper and lower accommodation spaces 11 of the introduction case 10, the connecting case 30, and the upper and lower accommodation spaces 11 of the discharge case 20.

External fluid is introduced into a fluid inlet 13 formed at one side of the introduction case 10, and is then introduced into the accommodation space 11 through a plurality of introduction windows 16 after moving along upper and lower channels 14 and an intermediate channel 12. Thus, the fluid comes into contact with surfaces of the hollow fiber bundles 40 and, as such, primarily absorbs moisture from the hollow fiber bundles 40.

Subsequently, the fluid secondarily absorbs moisture while passing through the connecting case 30, and then thirdly absorbs moisture while passing through the discharge case 20. Thereafter, the fluid is outwardly discharged through a fluid outlet after emerging from the accommodation spaces 11 of the discharge case 20 through discharge windows 21.

In the above-mentioned conventional structure, the upper and lower channels 14 and intermediate channel 12 in the introduction case 10 have the same cross-sectional area.

Figure 2:
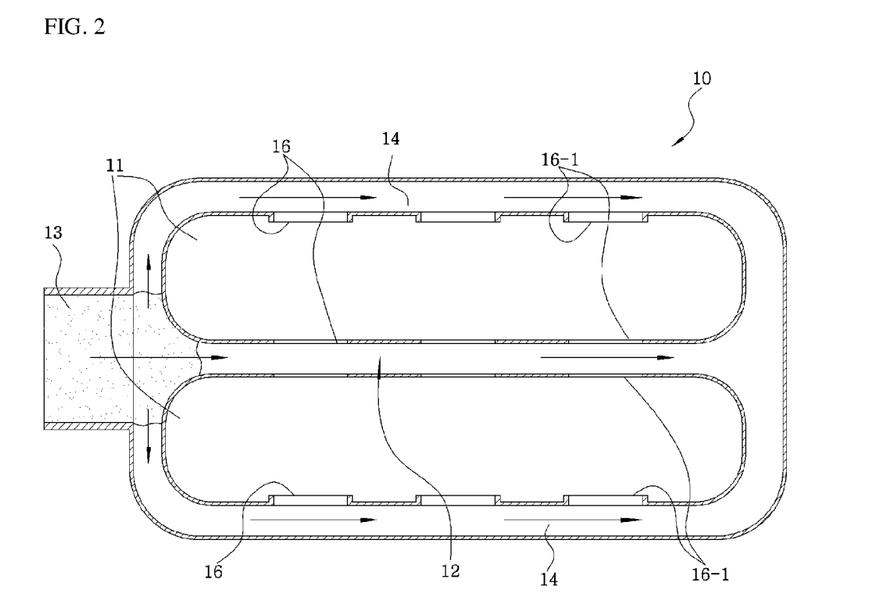
FIG. 2 is a front sectional view illustrating pressure distribution in a conventional introduction case.

Due to such a structure, when external fluid is supplied to the interior of the introduction case 10 through the fluid inlet 13, the external fluid strikes round corners of the upper and lower accommodation spaces 11 while entering the fluid inlet 13. As a result, as shown in FIG. 2, momentary stagnation zones may be formed around an inlet of the intermediate channel 12 and, as such, the pressure of the fluid in such zones greatly increases (as indicated by dots).

Since the intermediate channel 12 has a reduced size, as compared to a region around the inlet thereof, the flow velocity of the fluid in the intermediate channel 12 is abruptly increased, and is then gradually reduced as the fluid flows toward an end of the intermediate channel 12 opposite to the inlet (Areas exhibiting an increase in flow velocity are indicated by dots.).

Meanwhile, the pressure distribution in the intermediate channel 12 is established such that the fluid flowing through the intermediate channel 12 exhibits very low pressure in a section from the inlet of the intermediate channel 12 to a point spaced apart from the inlet by a certain distance while exhibiting increased pressure as it flows toward the end opposite to the inlet.

That is, in the conventional structure, there may be a phenomenon in which the internal pressure of the intermediate channel 12 in the introduction case 10 is lower than in the upper and lower channels 14 of the upper and lower accommodation spaces 11 and, as such, the flow velocity of the fluid in the intermediate channel 12 is higher than those of the upper and lower channels 14.

Due to such a phenomenon, that is, a difference between the internal pressure of the intermediate channel 12 and the internal pressure of each of the upper and lower channels 14, the fluid passing through the intermediate channel 12 may not be smoothly introduced into each accommodation space 11 and, as such, may be introduced into the intermediate channel 12.

As a result, there is a great difference between the flow rate of the fluid supplied through the intermediate channel 12 and the flow rate of the fluid supplied through the channel 14 around each accommodation space 11.

Figure 3:
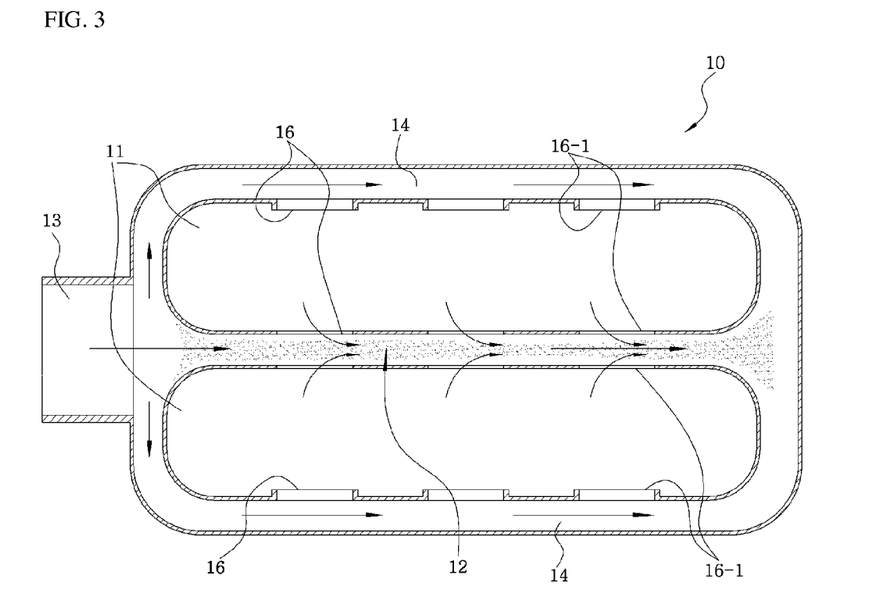
FIG. 3 is a front sectional view illustrating flow rate deviation in the conventional introduction case.

Furthermore, even in the upper and lower channels 14 and intermediate channel 12 around the accommodation spaces 11, an increase in pressure and a reduction in flow velocity is exhibited at points distant from the fluid inlet 13.

Since the intermediate channel 12 and upper and lower channels 14 each exhibit pressure deviation of different sections thereof, the flow rate of the fluid introduced into each accommodation space 11 in each channel is gradually increased toward the channel end opposite to the fluid inlet 13 such that the flow rate is higher at the introduction window 16-1 toward the channel end than at the introduction window 16 toward the fluid inlet 13.

That is, the hollow fiber bundles 40 in the introduction case 10 cannot uniformly contact the fluid throughout the entire section thereof due to the difference between the internal pressure of the intermediate channel 12 and the internal pressure of each of the upper and lower channels 14 in the introduction case 10 and pressure deviation of different sections of each channel.

Figure 4:
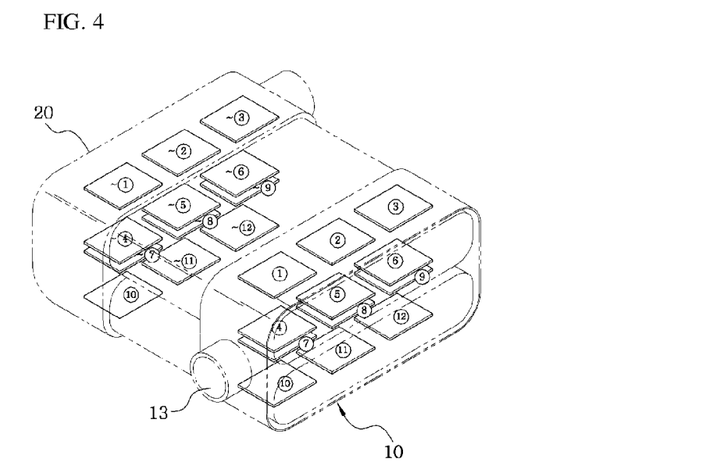
FIG. 4 is a schematic perspective view illustrating positions of windows in the conventional hollow fiber membrane module.

As can be experimentally demonstrated, referring to FIG. 4, the flow rate of the fluid passing through each of the windows 4, 5, 6, 7, 8, and 9 is considerably lower than the flow rate of the fluid passing through each of the windows 1, 2, 3, 10, 11, and 12, as in the following Table 1.

In addition, it may be seen that, even in the intermediate channel 12 and upper and lower channels 14, the flow rate of the fluid passing through the windows is gradually increased toward the channel end opposite to the fluid inlet such that the flow rate is considerably higher at the introduction windows 3, 6, 9, and 12 toward the channel end than at the introduction windows 1, 4, 7, and 10 toward the fluid inlet.

TABLE 1

| Flow Rate (%) of Fluid through Each Window | | |
|---|---|---|
| ① | ② | ③ |
| 10.9 | 10.9 | 12.6 |
| ④ | ⑤ | ⑥ |
| 4.1 | 4.6 | 6.7 |
| ⑦ | ⑧ | ⑨ |
| 3.8 | 4.5 | 7.2 |
| ⑩ | ⑪ | ⑫ |
| 11.1 | 11.2 | 12.5 |

CITATION LIST

Patent Literature (Patent Literature 1) Korean Registered Patent No. 10-0834121 (May 26, 2008)

DISCLOSURE

Technical Problem

Therefore, the present invention has been made in view of the above problems, and it is an object of the present invention to provide a hollow fiber membrane module capable of not only achieving a reduction in pressure deviation of channels in an introduction case, thereby bringing a fluid into uniform contact with hollow fibers while passing through the channels, but also achieving a reduction in pressure deviation of sections of each channel, thereby achieving uniform flow rates of the fluid through windows in the channel.

Technical Solution

In accordance with an aspect of the present invention, the above and other objects can be accomplished by the provision of a hollow fiber membrane module including an introduction case comprising a housing formed, at one side thereof, with a fluid inlet, a plurality of accommodation spaces formed in the housing in a vertically stacked state such that a gap is defined between adjacent ones of the accommodation spaces, a first channel formed between an uppermost one of the accommodation spaces and the housing, a second channel formed between a lowermost one of the accommodation spaces and the housing, and an intermediate channel formed at the gap, the first, second, and intermediate channels communicating with the fluid inlet, a discharge case spaced apart from the introduction case in a horizontal direction, the discharge case comprising a plurality of accommodation spaces defined in the discharge case, and a fluid outlet formed at one side of the discharge case, a connecting case arranged between the discharge case and the introduction case, and a plurality of hollow fiber bundles extending through the accommodation spaces of the introduction case, an interior of the connecting case, and the accommodation spaces of the discharge case, to be accommodated therein, wherein cross-sectional areas of the first and second channels are smaller than a cross-sectional area of the intermediate channel.

The hollow fiber membrane module may further include barrier walls arranged to enclose the accommodation spaces such that the accommodation spaces are defined by the barrier walls, respectively. A plurality of first introduction windows, a plurality of second introduction windows, and a plurality of intermediate windows to communicate the first, second, and intermediate channels may be formed at the barrier walls, to be arranged in a width direction of the barrier walls.

Each of the first and second channels may have a cross-sectional area gradually reduced in a direction from a channel end toward the fluid inlet to an opposite channel end.

The cross-sectional area of each of the first and second channels may be equal to or greater than the cross-sectional area of the intermediate channel in a predetermined channel section extending from a channel end toward the fluid inlet in a direction away from the channel end. The cross-sectional area of each of the first and second channels may be smaller than the cross-sectional area of the intermediate channel in a remaining channel section.

Each of the first and second channels may be formed, at an upper surface thereof, with a plurality of steps arranged in a width direction of the first and second channels. The cross-sectional area of each of the first and second channels may be reduced at each of the steps, to be gradually reduced.

Advantageous Effects

In accordance with various embodiments of the present invention, cross-sectional areas of the first and second channels are basically smaller than the cross-sectional area of the intermediate channel and, as such, pressure deviation between the internal pressure of each of the first and second channel and the internal pressure of the intermediate channel is correspondingly minimized. Accordingly, the fluid flowing through the intermediate channel may be smoothly introduced into the first and second accommodation spaces. As a result, the hollow fiber bundles accommodated in the accommodation spaces may uniformly contact the fluid throughout the entire portion thereof.

Since the cross-sectional areas of the first and second channels are gradually reduced in a direction from a channel end toward the fluid inlet to an opposite channel end, the internal pressure of each of the first and second channels is gradually reduced in one direction. As a result, flow rate deviation of the introduction windows in each of the first and second channels and, as such, flow rates of the introduction windows in each of the first and second channels become uniform.

DESCRIPTION OF DRAWINGS

The above and other objects, features and other advantages of the present invention will be more clearly understood from the following detailed description taken in conjunction with the accompanying drawings, in which.

BEST MODE

Hereinafter, concrete configurations and effects of the present invention will be described with reference to embodiments illustrated in the accompanying drawings. In the following description, a hollow fiber membrane module, which is illustrated as an example of a humidifying module, will be described. Of course, the hollow fiber membrane is not limited to the humidifying module, and may be a gas separating module or a water treating module.

Figure 5:
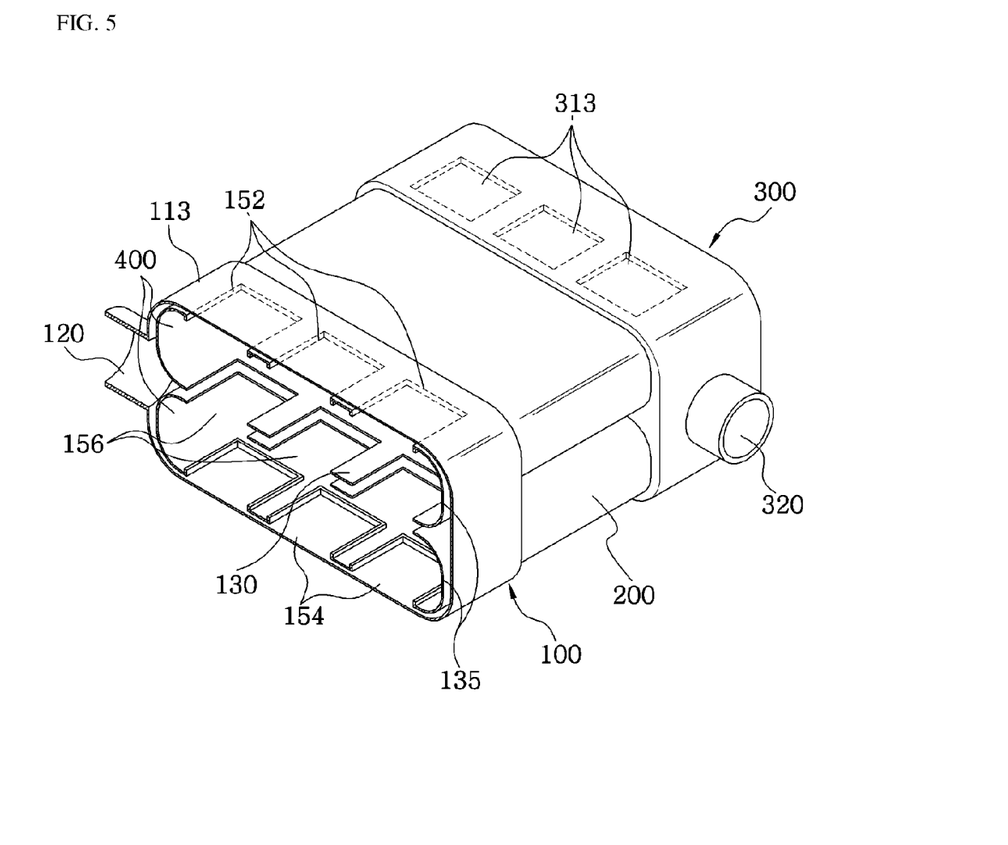
FIG. 5 is a partially-broken perspective view illustrating a hollow fiber membrane module of the present invention.
Figure 6:
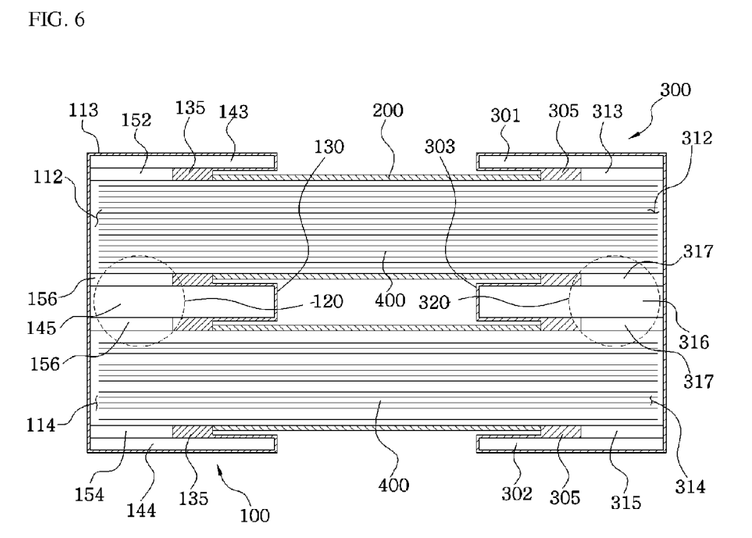
FIG. 6 is a lateral sectional view illustrating the hollow fiber membrane module of the present invention.

As illustrated in FIGS. 5 and 6, the hollow fiber membrane module of the present invention mainly includes an introduction case 100, a connecting case 200, a discharge case 200, and hollow fiber bundles 400.

Figure 7:
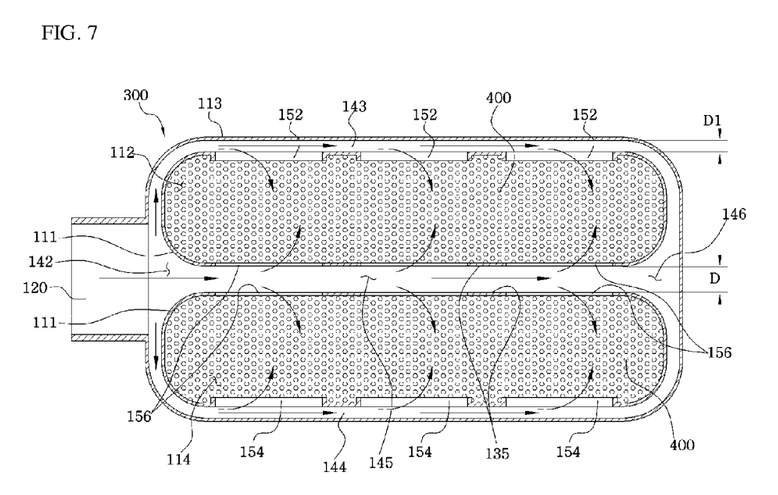
FIG. 7 is a front sectional view illustrating an introduction case.

The introduction case 100 is a component, which accommodates upstream ends of hollow fiber bundles 400, and initially receives an external fluid required for humidification, to initially bring the external fluid into contact with the hollow fiber bundles 400, which will be described later. As illustrated in FIGS. 5 to 7, the introduction case 100 includes a substantially box-shaped housing 113. Plural accommodation spaces 112 and 114 are formed in the housing 113, to accommodate the hollow fiber bundles 400. A fluid inlet 120 for the external fluid is formed at one side of the housing 113. The fluid inlet 120 communicates with the accommodation spaces 112 and 114 via channels.

The above-described structure will be described in more detail. The accommodation spaces 112 and 114 are formed to be vertically separated from each other. A first one of the accommodation spaces, namely, the accommodation space 112, is formed at an upper side, and a second one of the accommodation spaces, namely, the accommodation space 114, is formed at a lower side while defining a gap 130 extending horizontally between the first and second accommodation spaces 112 and 114 at an intermediate point. That is, the first and second accommodation spaces 112 and 114 are formed in the form of a vertically stacked structure while defining the gap 130 therebetween. Although the case, in which two accommodation spaces 112 and 114 are stacked, is mainly described, three or more accommodation spaces may be vertically stacked while defining a certain gap between adjacent ones of the accommodation spaces. In this case, another accommodation space or spaces may be interposed between the first and second accommodation spaces 112 and 114.

The first and second accommodation spaces 112 and 114 are defined by barrier walls 135 enclosing the first and second accommodation spaces 112 and 114. Each barrier wall 135 may have a structure having a substantially rectangular shape while being formed with a round portion 111 at each corner thereof.

The fluid inlet 120, which is formed at the housing 113, is a passage, into which an external fluid to come into contact with the hollow fiber bundles 400 is introduced. The fluid inlet 120 is formed at one side portion of the housing 113. In particular, the fluid inlet 120 may be formed at an intermediate point of the housing 113. That is, the fluid inlet 120 may be formed to be aligned with the gap 130.

An introduction channel is formed in the housing 113.

The introduction channel is formed to guide an external fluid introduced through the fluid inlet 120 to enter the accommodation spaces 112 and 114 after flowing around the first and second accommodation spaces 112 and 114. The introduction channel includes a distribution channel 142, a first channel 143, a second channel 144, an intermediate channel 145, and a junction channel 146.

The distribution channel 142 distributes the fluid emerging from the fluid inlet 120 into the first and second channels 143 and 144, and intermediate channel 145. The distribution channel 142 is formed in a region between corners of the first and second accommodation spaces 112 and 114 facing a downstream end of the fluid inlet 120 within the introduction case 100.

The intermediate channel 145 functions to guide the fluid introduced through the fluid inlet 120 to enter the first and second accommodation spaces 112 and 114 through a lower side of the first accommodation space 112 and an upper side of the second accommodation space 114 while flowing through the gap 130.

The intermediate channel 145 is formed throughout the gap 130 in a width direction of the gap 130. The intermediate channel 145 is connected, at one side thereof, with the distribution channel 142.

The first channel 143 functions to guide the fluid emerging from the fluid inlet 120 toward an upper side of the first accommodation space 112 so as to enter the first accommodation space 112 through the upper side of the first accommodation space 112.

The first channel 143 is formed to be connected, at one side thereof, to the distribution channel 142 while being connected, at the other side thereof, to the intermediate channel 145 after extending around the upper side of the first accommodation space 112 and an end of the first accommodate space 112 opposite to the distribution channel 142.

The second channel 144 functions to guide the fluid emerging from the fluid inlet 120 toward a lower side of the second accommodation space 114 so as to enter the second accommodation space 114 through the lower side of the second accommodation space 114.

The second channel 144 is formed to be connected, at one side thereof, to the distribution channel 142 while being connected, at the other side thereof, to the intermediate channel 145 after extending around the lower side of the second accommodation space 114 and an end of the second accommodate space 114 opposite to the distribution channel 142.

In the above-described channel structures, the fluid introduced through the fluid inlet 120 is distributed into the first channel 143, second channel 144, and intermediate channel 145 at the distribution channel 142, to flow around the first accommodation space 112 and second accommodation space 114.

For reference, the first and second channels 143 and 144 have a cross-sectional area smaller than the cross-sectional area of the intermediate channel 145 in the present invention, whereas, in conventional cases, the first and second channels 143 and 144 have the same cross-sectional area as the intermediate channel 145.

In detail, as illustrated in FIG. 7, the first and second channels 143 and 144 have a vertical width D1 smaller than a vertical width D of the intermediate channel 145 and, as such, have a cross-sectional area smaller than the intermediate channel 145. For example, when the vertical width of the intermediate channel 145 is 8 mm, the first and second channels 143 and 144 are formed to have a vertical width reduced to about 5 mm.

In the embodiment of FIG. 7, the first and second channels 143 and 144 are embodied to have a vertical width uniformly reduced throughout the entire section thereof.

The reason why the cross-sectional areas of the first and second channels 143 and 144 are reduced, as compared to the cross-sectional area of the intermediate channel 145, is to reduce pressure deviation generated during flow of the fluid. Functions and effects of such a configuration will be additionally described later.

The fluid comes into contact with the hollow fiber bundles 400 accommodated in the first and second accommodation spaces 112 and 114 while flowing along the introduction channel formed as described above. When the barrier walls 135 are formed to enclose the first and second accommodation spaces 112 and 114, introduction windows are formed at the barrier walls 135, to allow the fluid to be introduced into the first and second accommodation spaces 112 and 114.

The introduction windows function as passages to guide an external fluid, which flows along each introduction channel, to be introduced into the first and second accommodation spaces 112 and 114. The introduction windows include first introduction windows 152, second introduction windows 154, and intermediate windows 156.

The first introduction windows 152 function as passages to allow the fluid, which flows along the first channel 143, to be introduced into the first accommodation space 112. The first introduction windows 152 are formed at an upper side of the first accommodation space 112 while being arranged spaced apart from one another by a predetermined distance in a lateral width direction of the first accommodation space 112.

Accordingly, the first accommodation space 112 and first channel 143 communicate with each other through the first introduction windows 152.

The second introduction windows 154 function as passages to allow the fluid, which flows along the second channel 144, to be introduced into the second accommodation space 114. The second introduction windows 154 are formed at a lower side of the second accommodation space 114 while being arranged spaced apart from one another by a predetermined distance in a lateral width direction of the second accommodation space 114.

Accordingly, the second accommodation space 114 and second channel 144 communicate with each other through the second introduction windows 154.

The intermediate windows 156 function as passages to allow the fluid, which flows along the intermediate channel 145, to be introduced into the first and second accommodation spaces 112 and 114 in a simultaneous manner. The intermediate introduction windows 154 are formed at upper and lower sides of the intermediate channel 145 while being arranged spaced apart from one another by a predetermined distance in a lateral width direction of the barrier walls.

Accordingly, the intermediate channel 145 communicates with the first and second accommodation spaces 112 and 114 through the intermediate windows 156.

The connecting case 200 is connected to the introduction case 100, which has the above-described configuration.

The connecting case 200 accommodates middle portions of the hollow fiber bundles 400, which will be described later. The connecting case 200 also functions to connect the introduction case 100 and the discharge case 300, which will be described later. As illustrated in FIG. 6, the connecting case 200 has a hollow tube structure opened at opposite ends thereof, and is defined therein with an accommodation space, through which the hollow fiber bundles 440 extend.

The connecting case 200 is connected, at one end thereof, to a rear end of the introduction case 100 and, as such, the accommodation space of the connecting case 200 communicates with the first and second accommodation spaces 112 and 114 in a simultaneous manner.

In accordance with the above-described configuration, the fluid, which is introduced into the first and second accommodation spaces 112 and 114 through the first and second channels 143 and 144 and intermediate channel 145 of the introduction case 100, passes through the connecting case 200 in a continuous manner after passing through the first and second accommodation spaces 112 and 114.

The discharge case 300 is connected to the connecting case 200 connected as described above.

Figure 8:
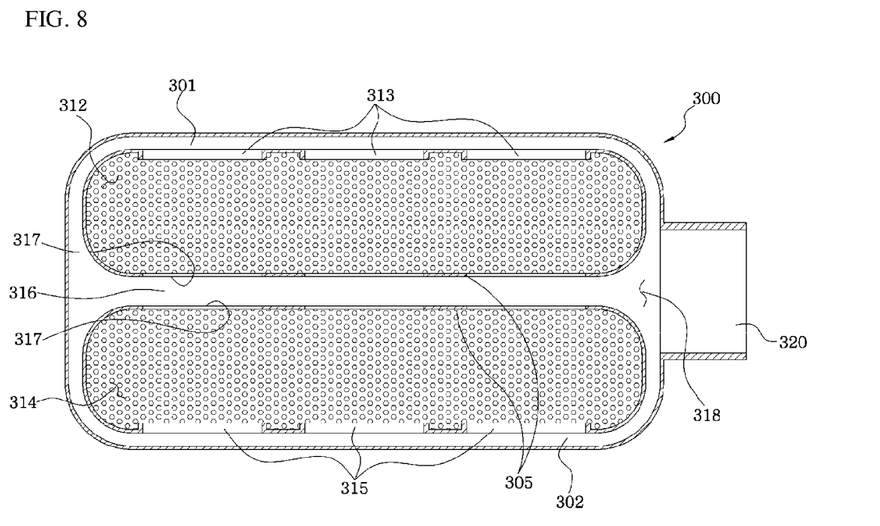
FIG. 8 is a front sectional view illustrating a discharge case.

The discharge case 300 is a component, which outwardly discharges the external fluid emerging from the connecting case 200 after guiding the fluid to come into contact with downstream ends of the hollow fiber bundles 400. As illustrated in FIGS. 6 and 8, the discharge case 300 is connected to the other end of the connecting case 300.

The discharge case 300 basically has the same structure as the introduction case 100. That is, basically, third and fourth accommodation spaces 312 and 314 are formed in the discharge case 300 in a vertically stacked state such that a second gap 303 is defined between the third and fourth accommodation spaces 312 and 314. The third and fourth accommodation spaces 312 and 314 are defined by second barrier walls 305, which enclose the third and fourth accommodation spaces 312 and 314.

A third channel 301 is formed around opposite lateral sides of the third accommodation space 312 and an upper side of the third accommodation space 312. A plurality of first discharge windows 313 is arranged in a lateral width direction of the third accommodation space 312 at the second barrier wall 305 contacting the third channel 301.

A fourth channel 302 is formed around opposite lateral sides of the fourth accommodation space 314 and a lower side of the fourth accommodation space 314. A plurality of second discharge windows 315 is arranged in a lateral width direction of the fourth accommodation space 314 at the second barrier wall 305 contacting the fourth channel 302.

A second intermediate channel 316 is formed along the second gap 303. A plurality of second intermediate windows 317 is arranged in a lateral width direction of the second barrier wall 305 at the second intermediate channel 316.

A fluid outlet 320 is formed at one side of the discharge case 300, to communicate with the third and fourth channels 301 and 302 and the second intermediate channel 316. A second junction channel 318 is formed in front of an upstream end of the fluid outlet 320, to join the third channel 301, fourth channel 302, and second intermediate channel 316.

The fluid outlet 320 is formed at a point symmetrical with the fluid outlet 120 of the introduction case 100 while being aligned with the second barrier wall 305.

In accordance with the above-described configuration, the fluid, which emerges from the connecting case 200, flows along the first and second channels 143 and 144 and second intermediate channel 316 through the first and second discharge windows 313 and 315 and second intermediate windows 317 after passing through the third and fourth accommodation spaces 312 and 314. Thereafter, the fluid is outwardly discharged through the fluid outlet 320 after being joined in the second junction channel 318.

The hollow fiber bundles 400 are installed within the introduction case 100, connecting case 200, and discharge case 300, which are connected as described above.

The hollow fiber bundles 400 function to exchange moisture between a fluid introduced into the hollow fiber bundles 400 and a fluid contacting outer surfaces of the hollow fiber bundles 400. Each hollow fiber bundle 400 is formed by bundling a plurality of hollow fiber strands. Each hollow fiber has a hollow tube shape as the name implies.

The hollow fiber bundles 400, which have the above-described bundle shape, are accommodated, at upstream ends thereof, in the first and second accommodation spaces 112 and 114 of the introduction case 110 in a divided state, and accommodated, at downstream ends thereof, in the third and fourth accommodation spaces 312 and 314 of the discharge case 300 after extending, at middle portions thereof, through the connecting case 200.

As the hollow fiber bundles 400, well-known products may be used and, as such, no additional description thereof will be given.

Hereinafter, functions of the illustrated embodiment according to the above-described configurations and particular effects generated in accordance with those functions will be described.

Moisture exchange may be carried out from a fluid flowing through interiors of the hollow fiber bundles 400 to a fluid flowing around the hollow fiber bundles 400. On the other hand, moisture exchange may be carried out from the fluid flowing around the hollow fiber bundles 400 to the fluid flowing through interiors of the hollow fiber bundles 400. However, the following description will be given only in conjunction with the case in which moisture exchange is carried out from the fluid flowing through interiors of the hollow fiber bundles 400 to the fluid flowing around the hollow fiber bundles 400.

A fluid having a relatively high moisture content is supplied to an interior of each hollow fiber bundle 400, and a fluid having a relatively low moisture content is introduced into the fluid inlet 120.

The fluid, which emerges from the fluid inlet 120, is introduced into the distribution channel 142 defined in the introduction case 100, as illustrated in FIG. 7.

The fluid is subsequently distributed into the intermediate channel 145 and the first and second channels 143 and 144. The fluid introduced into the intermediate channel 145 enters the accommodation spaces 112 and 114 through the intermediate windows 156 while flowing along the intermediate channel 145 and, as such, absorbs moisture while contacting portions of the hollow fiber bundles 400 disposed in the first and second accommodation spaces 112 and 114.

In this case, the flow velocity of the fluid flowing through the intermediate channel 145 is high because the intermediate channel 145 is aligned with the fluid inlet 120, as described above, and the fluid flows along round portions of the first and second accommodation spaces 112 and 114 during introduction thereof into the intermediate channel 145.

On the other hand, the fluid introduced into the first channel 143 and the fluid introduced into the second channel 144 flow around the upper side of the first accommodation space 112 and the lower side of the second accommodation space 114, respectively, and, as such, are introduced into the first and second accommodation spaces 112 and 114 through the first and second introduction windows 152 and 154, respectively. The fluid introduced into the first and second accommodation spaces 112 and 114 absorbs moisture while contacting the hollow fiber bundles 400.

In conventional cases, the fluid flowing through the intermediate channel 145 cannot be smoothly introduced into the first and second accommodation spaces 112 and 114 in accordance with Bernoulli's principle because the fluid flowing through the intermediate channel 145 exhibits higher flow velocity than the fluid flowing through the first and second channels 143 and 144 while exhibiting relatively low pressure, as mentioned above.

On the other hand, in accordance with the present invention, the fluid flowing through the first and second channels 143 and 144 exhibits reduced pressure, as compared to conventional cases, while exhibiting high flow velocity because the first and second channels 143 and 144 have a reduced vertical width D1 such that the total cross-sectional area thereof is smaller than the cross-sectional area of the intermediate channel 145.

That is, pressure deviation between each of the first and second channels 143 and 144 and the intermediate channel 145 is minimized through a reduction in the diameters of the first and second channels 143 and 144, and thus a reduction in the pressure of the fluid flowing through the first and second channels 143 and 144.

In accordance with a reduced pressure deviation between each of the first and second channels 143 and 144 and the intermediate channel 145, the fluid flowing through the intermediate channel 145 can be smoothly introduced into the first and second accommodation spaces 112 and 114 through the intermediate windows 156.

As a result, the flow rates of the fluid passing though the first introduction windows 152, second introduction windows 154, and intermediate windows 156 are substantially equal and, as such, the hollow fiber bundles 400 uniformly contact the fluid throughout the portions thereof accommodated in the first and second accommodation spaces 112 and 114. Thus, the moisture content of the fluid is increased.

After conducting experiments with regard to the structure of the present invention, it can be seen that it is possible to reduce pressure deviation between the fluid passing through each of the first and second channels 143 and 144 and the fluid passing through the intermediate channel 145, and to minimize flow velocity deviation between the fluid passing through each of the first and second channels 143 and 144 and the fluid passing through the intermediate channel 145.

Figure 12:
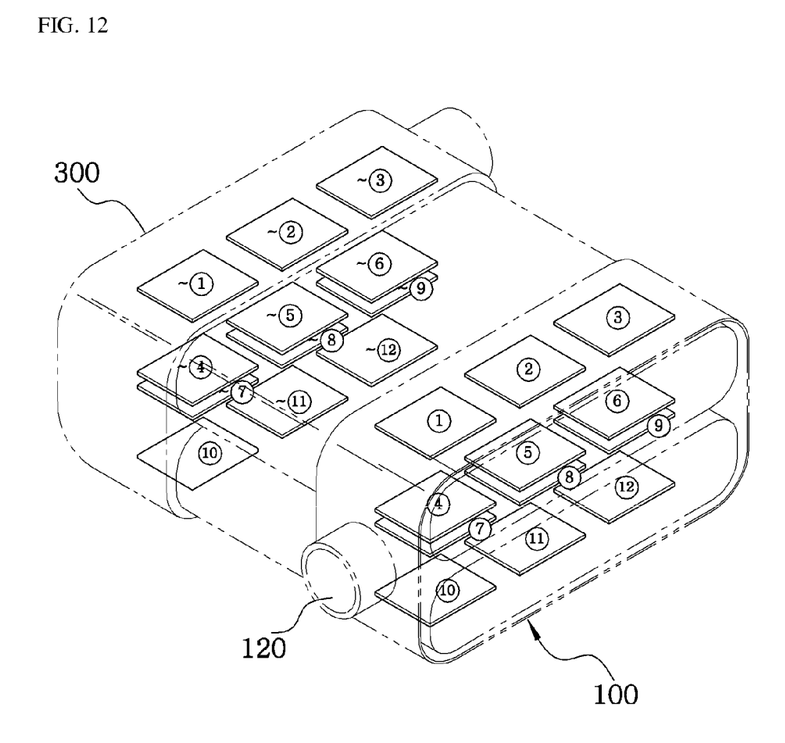
FIG. 12 is a schematic perspective view illustrating positions of windows in the hollow fiber membrane module of the present invention.

Referring to FIG. 12, the flow rate deviation between the fluid passing through each of the intermediate windows 4, 5, 6, 7, 8, and 9 and the fluid passing through each of the windows 1, 2, 3, 10, 11, and 12 is minimized, as in the following Table 2. In addition, even in the channels 145, 143, and 144, deviation of the flow rates of the fluid passing through the windows 1, 4, 7, and 10 toward the fluid inlet 120 and the flow rates of the fluid passing through the windows 3, 6, 9, and 12 opposite to the fluid inlet 120 are minimized.

TABLE 2

Flow Rate (%) of Fluid through Each Window

| ① | ② | ③ |
|---|---|---|
| 8 | 8.5 | 9.3 |
| ④ | ⑤ | ⑥ |
| 7.3 | 7.8 | 9.0 |
| ⑦ | ⑧ | ⑨ |
| 7.2 | 7.6 | 9.1 |
| ⑩ | ⑪ | ⑫ |
| 8.3 | 8.7 | 9.2 |

The external fluid contacting the hollow fiber bundles 400 while passing through the first and second accommodation spaces 112 and 114 additionally comes into contact with the hollow fiber bundles 400 while passing through the connecting case 200 and, as such, additionally absorbs moisture. Even in the third and fourth accommodation spaces 312 and 314, the fluid contacts the hollow fiber bundles 400.

Thereafter, the fluid passes through the first and second discharge windows 313 and 315, and the second intermediate windows 317, to be introduced into the third and fourth channels 301 and 302, and the second intermediate channel 316, and is then discharged through the fluid outlet 320 after being joined in the second junction channel 318.

Figure 9:
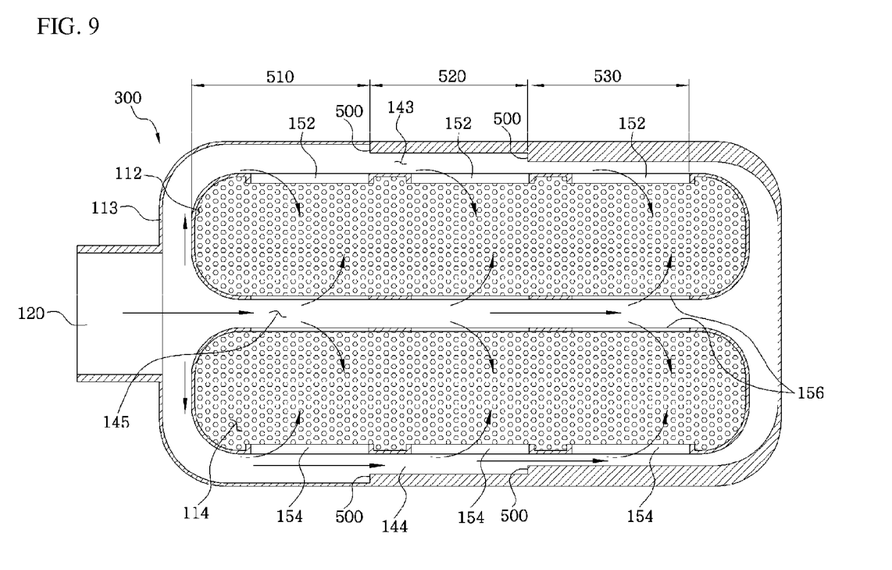
FIG. 9 is a schematic sectional view illustrating the case in which cross-sectional areas of first and second channels are reduced through formation of steps.
Figure 10:
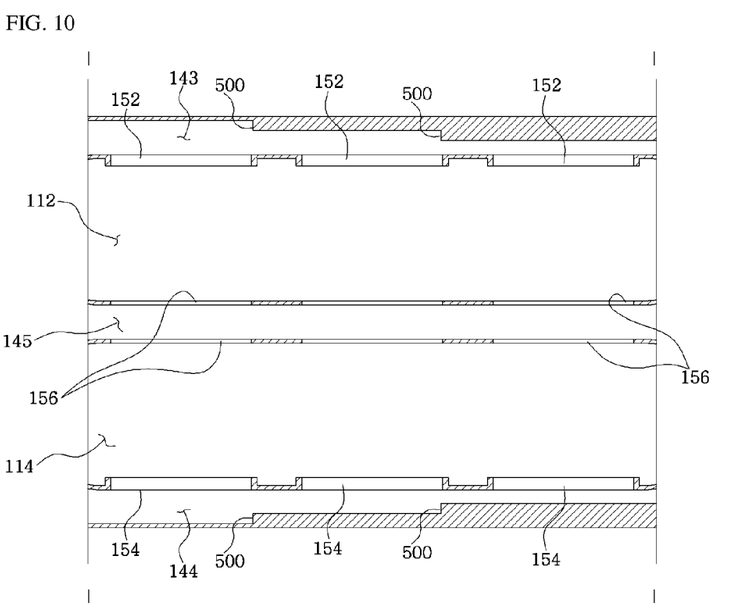
FIG. 10 is an enlarged sectional view illustrating a portion of FIG. 9.
Figure 11:
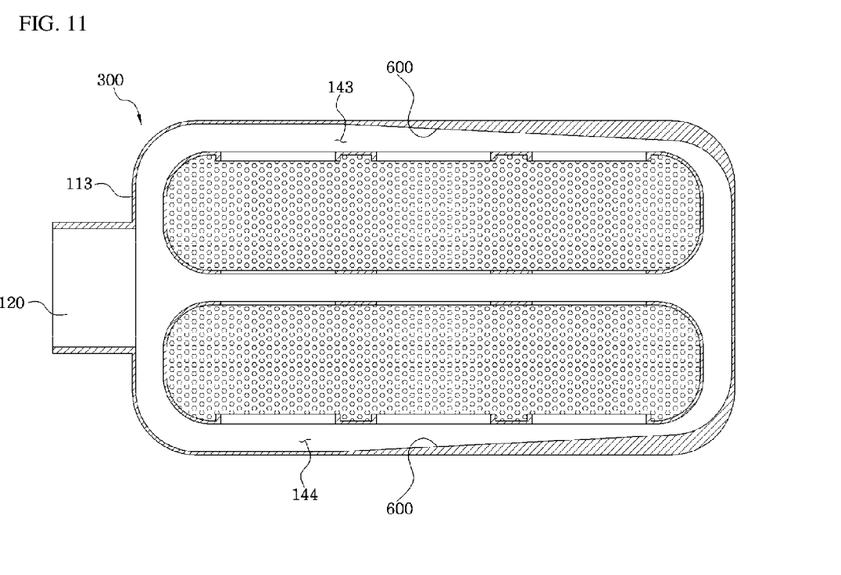
FIG. 11 is a view illustrating the case in which cross-sectional areas of first and second channels are reduced through formation of inclined surfaces at the first and second channels.

FIGS. 9 to 11 are views illustrating a modified embodiment of the present invention. This embodiment is identical to the above-described embodiment in terms of the basic concept of the present invention in that the cross-sectional areas of the first and second channels 143 and 144 are smaller than the cross-sectional area of the intermediate channel 145. However, this embodiment is different from the above-described embodiment in terms of the cross-section reduction structures of the first and second channels 143 and 144, in order to minimize flow rate deviation of the first introduction windows 152 of the first channel 143 and flow rate deviation of the second introduction windows 154 of the second channel 144.

The embodiment illustrated in FIGS. 9 and 10 is characterized in that the cross-sectional areas of the first and second channels 143 and 144 are stepwise reduced at different sections thereof through formation of steps at each of the first and second channels 143 and 144.

That is, as illustrated in the drawings, steps 500 are formed at an upper surface of the first channel 143 while being spaced apart from one another in a lateral width direction of the first channel 143 by a predetermined distance.

In this case, the steps 500 are sequentially formed from a portion of the first channel 143 toward the fluid inlet 120 to a portion of the first channel 143 toward an end of the first channel 143 opposite to the fluid inlet 120, to have gradually increased heights, respectively. As a result, the first channel 143 has a cross-sectional area gradually reduced in a direction from the end of the first channel 143 toward the fluid inlet 120 to the opposite end of the first channel 143.

Since the steps are spaced apart from one another, cross-section reduction sections 510, 520, and 530 are defined among the steps.

The cross-section reduction sections 510, 520, and 530 are aligned with respective first introduction windows 152 and, as such, the pressure of each cross-section reduction section is effectively applied to a corresponding one of the first introduction windows 152.

Steps are also formed at a lower surface of the second channel 144, to be symmetrical with the above-described steps. Accordingly, the first and second channels 143 and 144 have cross-sectional reduction structures, which are vertically symmetrical with each other, respectively.

As the cross-sectional areas of the first and second channels 143 and 144 are gradually reduced in a direction away from the fluid inlet 120, the internal pressures of the first and second channels 143 and 144 are also gradually reduced in a direction away from the fluid inlet 120.

Accordingly, a pressure difference is generated between a pressure-reduced portion of each of the first and second channels 143 and 144 and a corresponding one of the first and second accommodation spaces 112 and 114. As a result, the flow rates of the fluid supplied to the first and second accommodation spaces 112 and 114 through the first and second introduction windows 154 are reduced in accordance with Bernoulli's principle.

As a result, the flow rate of the fluid passing through the first and second introduction windows toward the fluid inlet 120, namely, the first and second introduction windows 152 and 154, which correspond to introduction windows exhibiting reduced flow rates in conventional cases, is increased. Accordingly, flow rate deviation of the first introduction windows 152 of the first channel 143, and flow rate deviation of the second introduction windows 154 of the second channel 144 are minimized.

As apparent from the above description, the present invention is characterized by reducing a deviation between the internal pressure of each of the first and second channels 143 and 144 and the internal pressure of the intermediate channel 145 through formation of the first and second channels 143 and 144 and intermediate channel 145 such that the cross-sectional areas of the first and second channels 143 and 144 are basically smaller than the cross-sectional area of the intermediate channel 145, in order to allow the fluid flowing through the intermediate channel 145 to be smoothly introduced into the first and second accommodation spaces 112 and 114.

In addition, the present invention is characterized by minimizing flow rate deviation of the first introduction windows 152 while minimizing flow rate deviation of the second introduction windows 154 through a gradual reduction in the cross-sectional areas of the first and second channels 143 and 144 in a direction from the fluid inlet 120 to the channel end opposite to the fluid inlet 120.

For reference, the structure for gradually reducing the cross-sectional area of each of the first and second channels 143 and 144 in one direction and the structures for equally reducing the cross-sectional area of each of the first and second channels 143 and 144 throughout the entire channel section may be selectively applied, if necessary.

Referring to FIG. 11, another embodiment of the present invention is illustrated. This embodiment is identical to the above-described embodiments in terms of the basic concept of the present invention in that the cross-sectional areas of the first and second channels 143 and 144 are reduced in one direction. However, this embodiment is different from the above-described embodiments in that inclined surfaces 600 are formed at the upper surface of the first channel 143 and the lower surface of the second channel 144, respectively, in order to continuously reduce the cross-sectional areas of the first and second channels 143 and 144.

Structures for achieving continuous reduction in cross-sectional area, using the inclined surfaces 600 not only provide substantially the same effect as the structure of forming the steps, but also have advantages of easy formation of the first and second channels 143 and 144, as compared to the step structures.

MODE FOR INVENTION

Various embodiments have been described in the best mode for carrying out the invention.

INDUSTRIAL APPLICABILITY

Although the preferred embodiments of the present invention have been disclosed for illustrative purposes, those skilled in the art will appreciate that various modifications, additions and substitutions are possible, without departing from the scope and spirit of the invention as disclosed in the accompanying claims, so long as those modifications, additions and substitutions are associated with structures for minimizing internal pressure deviation between the intermediate channel and each of the first and second channels through formation of the intermediate channel and the first and second channels such that the cross-sectional areas of the first and second channels are smaller than the cross-sectional area of the intermediate channel, in order to allow an external fluid passing through the intermediate channel to be smoothly introduced into the first and second accommodation spaces.

The invention claimed is:
1. A hollow fiber membrane module comprising:
an introduction case comprising a housing formed, at one side thereof, with a fluid inlet, a plurality of accommodation spaces formed in the housing in a vertically stacked state such that a gap is defined between adjacent ones of the accommodation spaces, a first channel formed between an uppermost one of the accommodation spaces and the housing, a second channel formed between a lowermost one of the accommodation spaces and the housing, and an intermediate channel formed at the gap, the first, second, and intermediate channels communicating with the fluid inlet;
a discharge case spaced apart from the introduction case in a horizontal direction, the discharge case comprising a plurality of accommodation spaces defined in the discharge case, and a fluid outlet formed at one side of the discharge case;
a connecting case arranged between the discharge case and the introduction case; and
a plurality of hollow fiber bundles extending through the accommodation spaces of the introduction case, an interior of the connecting case, and the accommodation spaces of the discharge case, to be accommodated therein,
wherein cross-sectional areas of the first and second channels are smaller than a cross-sectional area of the intermediate channel.
2. The hollow fiber membrane module according to claim 1, further comprising:
barrier walls arranged to enclose the accommodation spaces such that the accommodation spaces are defined by the barrier walls, respectively,
wherein a plurality of first introduction windows, a plurality of second introduction windows, and a plurality of intermediate windows to communicate the first, second, and intermediate channels are formed at the barrier walls, to be arranged in a width direction of the barrier walls.
3. The hollow fiber membrane module according to claim 1, wherein each of the first and second channels has a cross-sectional area gradually reduced in a direction from a channel end toward the fluid inlet to an opposite channel end.
4. The hollow fiber membrane module according to claim 2, wherein:
the cross-sectional area of each of the first and second channels is equal to or greater than the cross-sectional area of the intermediate channel in a predetermined channel section extending from a channel end toward the fluid inlet in a direction away from the channel end; and
the cross-sectional area of each of the first and second channels is smaller than the cross-sectional area of the intermediate channel in a remaining channel section.
5. The hollow fiber membrane module according to claim 2, wherein:
each of the first and second channels is formed, at an upper surface thereof, with a plurality of steps arranged in a width direction of the first and second channels; and
the cross-sectional area of each of the first and second channels is reduced at each of the steps, to be gradually reduced.

* * * * *